United States Patent [19]
Lin

[11] Patent Number: 5,625,658
[45] Date of Patent: Apr. 29, 1997

[54] PRE-OXIDATION OF OXIDE FILM FOR CHEMICAL DECONTAMINATION OF RECIRCULATION PIPING

[75] Inventor: Chien-Chang Lin, Fremont, Calif.

[73] Assignee: General Electric Company, San Jose, Calif.

[21] Appl. No.: 520,454

[22] Filed: Aug. 29, 1995

[51] Int. Cl.$^6$ ................................................ G21C 19/00
[52] U.S. Cl. ............................................... 376/306; 376/310
[58] Field of Search ................................ 376/306, 305, 376/310, 308

[56] References Cited

U.S. PATENT DOCUMENTS

| | | |
|---|---|---|
| 3,873,362 | 3/1975 | Mihram et al. |
| 4,042,455 | 8/1977 | Brown. |
| 4,722,823 | 2/1988 | Honda et al. ............... 376/306 |
| 5,084,235 | 1/1992 | Ibe et al. .................... 376/306 |
| 5,517,539 | 5/1996 | Corpora et al. ............ 376/306 |

OTHER PUBLICATIONS

"Effects of Hydrogen Water Chemistry on Radiation Field Buildup in BWRs", Chien C. Lin et al., Int'l. Conf. on Chemistry in Water Reactors, Apr. 24–27, 1994, Nice, France.

Primary Examiner—Daniel D. Wasil
Attorney, Agent, or Firm—James E. McGinness

[57] ABSTRACT

A pre-oxidation treatment for decreasing the amount of chromium deposited on out-of-core surfaces such as the internal surfaces of recirculation piping. Hydrogen peroxide is injected into the reactor coolant through the recirculation line during reactor shutdown after $H_2$ addition has been terminated. A dilute acid solution (e.g., nitric acid) is also injected into the loop to serve as a catalyst to accelerate the oxidation reactions. An appropriate water pH (e.g., in the range of 5–6) is maintained by acid injection. The coolant temperature during shutdown is maintained at approximately 150° C. or lower. The peroxide concentration in the recirculation piping is maintained at approximately 1 ppm or higher as needed. The oxidation process should be allowed to take effect in the proposed temperature range with the recirculation pump in operation for at least a few hours to 24 hours, depending on the temperature and the oxide film thickness. The Cr-enriched oxides can be readily oxidized by the hydrogen peroxide to a soluble chromate under proper conditions. Some of the radioactivities associated with the oxides will then be released into the coolant and consequently removed by the reactor water cleanup system.

14 Claims, 2 Drawing Sheets

PRE-OXIDATION OF OXIDE FILM FOR CHEMICAL DECONTAMINATION OF RECIRCULATION PIPING

FIELD OF THE INVENTION

This invention relates to decreasing the radio-active contamination on components of a boiling water reactor (BWR). In particular, the invention relates to processes for decontamination of recirculation piping in a BWR.

BACKGROUND OF THE INVENTION

A conventional BWR comprises a reactor pressure vessel containing reactor coolant which removes heat from the nuclear core. BWRs use high-purity water as the neutron moderator and primary coolant in the production of steam. Respective piping circuits carry the heated water or steam to the steam generators or turbines and carry circulated water or feedwater back to the vessel.

Stress corrosion cracking (SCC) is a known phenomenon occurring in reactor components, such as structural members, piping, fasteners, and welds, exposed to high-temperature (i.e., 150° C. or higher) water. SCC refers to cracking propagated by static or dynamic tensile stressing in combination with corrosion at the crack tip. It is well known that SCC occurs at higher rates when oxygen is present in the reactor water in concentrations of about 5 ppb or greater. SCC is further increased in a high radiation flux where oxidizing species, such as oxygen, hydrogen peroxide, and shortlived radicals, are produced from radiolytic decomposition of the reactor water.

In a BWR, the radiolysis of the primary water coolant in the reactor core causes the net decomposition of a small fraction of the water to the chemical products $H_2$, $H_2O_2$, $O_2$ and oxidizing and reducing radicals. For steady-state operating conditions, equilibrium concentrations of $O_2$, $H_2O_2$, and $H_2$ are established in both the water which is recirculated and the steam going to the turbine. As a result of water radiolysis, the coolant in the BWR under normal water chemistry (NWC) operation conditions contains approximately 200 ppb of oxidants ($O_2+H_2O_2$) in the recirculation line and several hundred ppb of oxidants in the core region. This range of oxidant concentration increases the potential susceptibility of austenitic stainless steel and certain nickelbase alloys to intergranular stress corrosion cracking (IGSCC) when other requisite factors such as stress and sensitization are present.

One method employed to mitigate IGSCC of susceptible material is the application of hydrogen water chemistry (HWC), whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species to reform water, thereby lowering the concentration of dissolved oxidizing species in the water in the vicinity of metal surfaces. The rate of these recombination reactions is dependent on local radiation fields, water flow rates and other variables. Corrosion potentials of austenitic stainless steels and certain nickel-base alloys in contact with reactor water containing oxidizing species can be decreased below a critical potential by injection of hydrogen into the water so that the dissolved concentration is about 50 ppb or greater. For adequate feedwater hydrogen addition rates, conditions necessary to inhibit IGSCC can be established in certain locations of the reactor. Different locations in the reactor system require different levels of hydrogen addition.

In some reactors after switching from NWC to HWC, an increase in recirculation piping dose rates has been observed, but other plants have shown very minimal or no effect. For those reactors showing a significant increase in dose rates, the piping contamination also appears to be more resistant to the conventional chemical decontamination processes. Consequently, in some cases, reactor operators are forced to reschedule the maintenance tasks to avoid high radiation exposures to skilled workers. Although the exact reasons for poor decontamination are not known, it has been suggested that a Cr-enriched oxide film can be formed on stainless steel surfaces under HWC conditions. This Cr-enriched oxide film probably provides the necessary protection of base metal from corrosion, but it may also provide additional adsorption and/or reaction sites for Co-60 deposition on stainless steel surfaces.

In a paper entitled "Effects of HWC on Radiation Field Buildup in BWRs", Int'l. Conf. Chemistry in Reactors, Apr. 24–27, 1994, Nice, France, Lin et al. reported gamma scan results obtained in a number of reactors. Evaluation of these results revealed that the Cr-51 activity was measured at much higher levels under HWC conditions than under NWC conditions. Under NWC conditions, Cr-51 is present in reactor water in anionic forms, most likely $HCrO_4^-$, at approximately 1–5 µCi/kg. Even at this high concentration, very little Cr-51 activity has been measured on piping surfaces simply because the solubilities of $Cr^{+6}$ compounds are just too high under NWC conditions. Under HWC conditions the Cr-51 concentration in the reactor water generally drops down to <0.1 µCi/kg. Although the chemistry environment in the core region may still be oxidizing, the out-of-core regions, particularly the recirculation lines and sample lines, may be very reducing, and therefore the $Cr^{+6}$ ions are reduced to $Cr^{+3}$ in more insoluble forms $Cr_2O_3$ or $Cr(OH)_3$ and disappear in water by depositing on out-of-core surfaces, or even fuel surfaces in more reducing areas. In a few plants the Cr-51 activity was measured at 5–25 µCi/cm² on recirculation pipe surfaces. By a simple calculation assuming the specific activity of Cr-51 is about 5 µCi/gm, the pipe surface is very likely to be covered by an extra layer of about 0.01 mg Cr/cm² in the form of $Cr_2O_3$. Although the piping surface oxide film was not analyzed, several crud samples taken from jet pump and some steam/turbine system surfaces in a reactor were analyzed. Both Cr and Cr-51 were measured in significant proportions. In addition to the Cr-enriched oxide film already created under HWC conditions, an extra layer of Cr deposition may quickly become a favorable adsorption surface for soluble radioisotopes such as Zn-65 and Co-60. Consequently, the dose rates are significantly increased in some plants.

Thus, it is desirable to remove as much of the Cr-enriched oxide film as possible from the recirculation piping of a BWR. However, the stable Cr-enriched oxides, including mixed oxides and chromite, may be more difficult for decontamination solution to dissolve with conventional decontamination processes. Thus, a process is needed which overcomes the Cr-enriched oxide problem for decontamination processes.

SUMMARY OF THE INVENTION

The present invention offers a simple technique which overcomes the Cr-enriched oxide problem for decontamination processes. The technique is based on the hypothesis that the Cr-enriched oxides can be readily oxidized by hydrogen peroxide ($H_2O_2$) to a soluble chromate under proper conditions. Some of the radioisotopes associated with the oxides will then be released into the coolant and consequently removed by the reactor water cleanup system. More importantly, the oxide film structure is changed for easier dissolution by conventional decontamination solutions.

In accordance with the present invention, the most favorable time to inject hydrogen peroxide is during the reactor shutdown after $H_2$ addition is terminated. The coolant temperature during shutdown is maintained at approximately 150° C. or lower. Then the recirculation piping to be decontaminated is isolated by closing valves which connect the recirculation piping to the reactor pressure vessel and opening valves which connect the recirculation piping at two junctions to form a closed loop having an injection port. While the recirculation pump continues to run, causing coolant in the closed loop to circulate, hydrogen peroxide is injected into the coolant through the injection port. The peroxide concentration is maintained at approximately 1 ppm or higher as needed. A dilute acid solution is also injected into the loop to serve as a catalyst to accelerate the oxidation reactions. The oxidation process should be allowed to take effect in the proposed temperature range with the recirculation pump in operation for at least a few hours to 24 hours, depending on the temperature and the oxide film thickness.

The proposed technique is needed only for the recirculation piping system which has been operated under HWC conditions and is prepared for chemical decontamination. With this pre-oxidation process, the efficiency of the decontamination process should be considerably improved.

DETAILED DESCRIPTION OF THE PREFERRED EMBODIMENT

Figure 1:
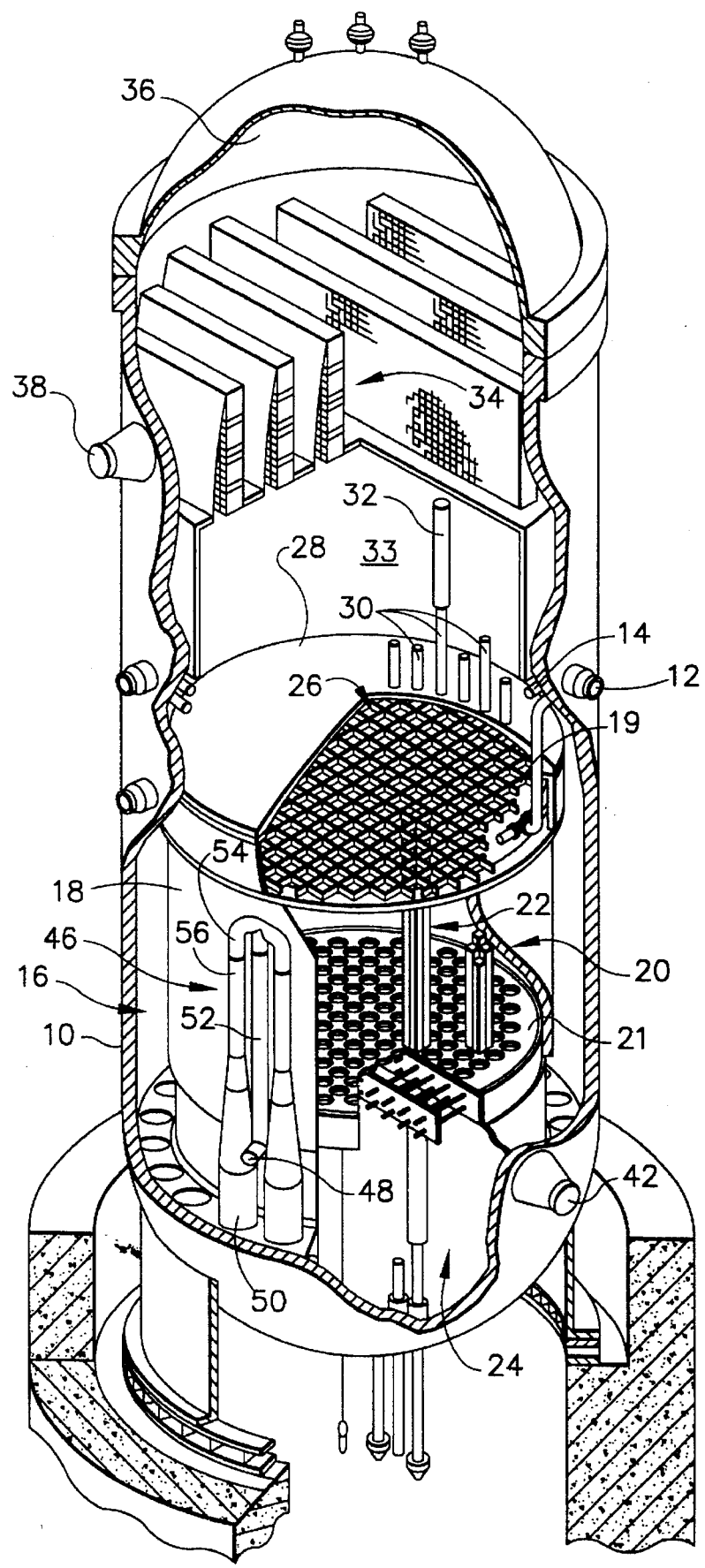
FIG. 1 is a schematic showing a partially cutaway isometric view of a conventional BWR.

The fluid flow in a boiling water reactor will be generally described with reference to FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. The feedwater from feedwater sparger 14 flows downwardly through the downcomer annulus 16, which is an annular region between RPV 10 and core shroud 18. Core shroud 18 is a stainless steel cylinder which surrounds the core 20 comprising numerous fuel assemblies 22 (only two 2×2 arrays of which are depicted in FIG. 1). Each fuel assembly is supported at the top by top guide 19 and at the bottom by core plate 21. Water flowing through downcomer annulus 16 then flows to the core lower plenum 24.

The water subsequently enters the fuel assemblies 22 disposed within core 20, wherein a boiling boundary layer (not shown) is established. A mixture of water and steam enters core upper plenum 26 under shroud head 28. Core upper plenum 26 provides standoff between the steam-water mixture exiting core 20 and entering vertical standpipes 30, which are disposed atop shroud head 28 and in fluid communication with core upper plenum 26. The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

Figure 2:
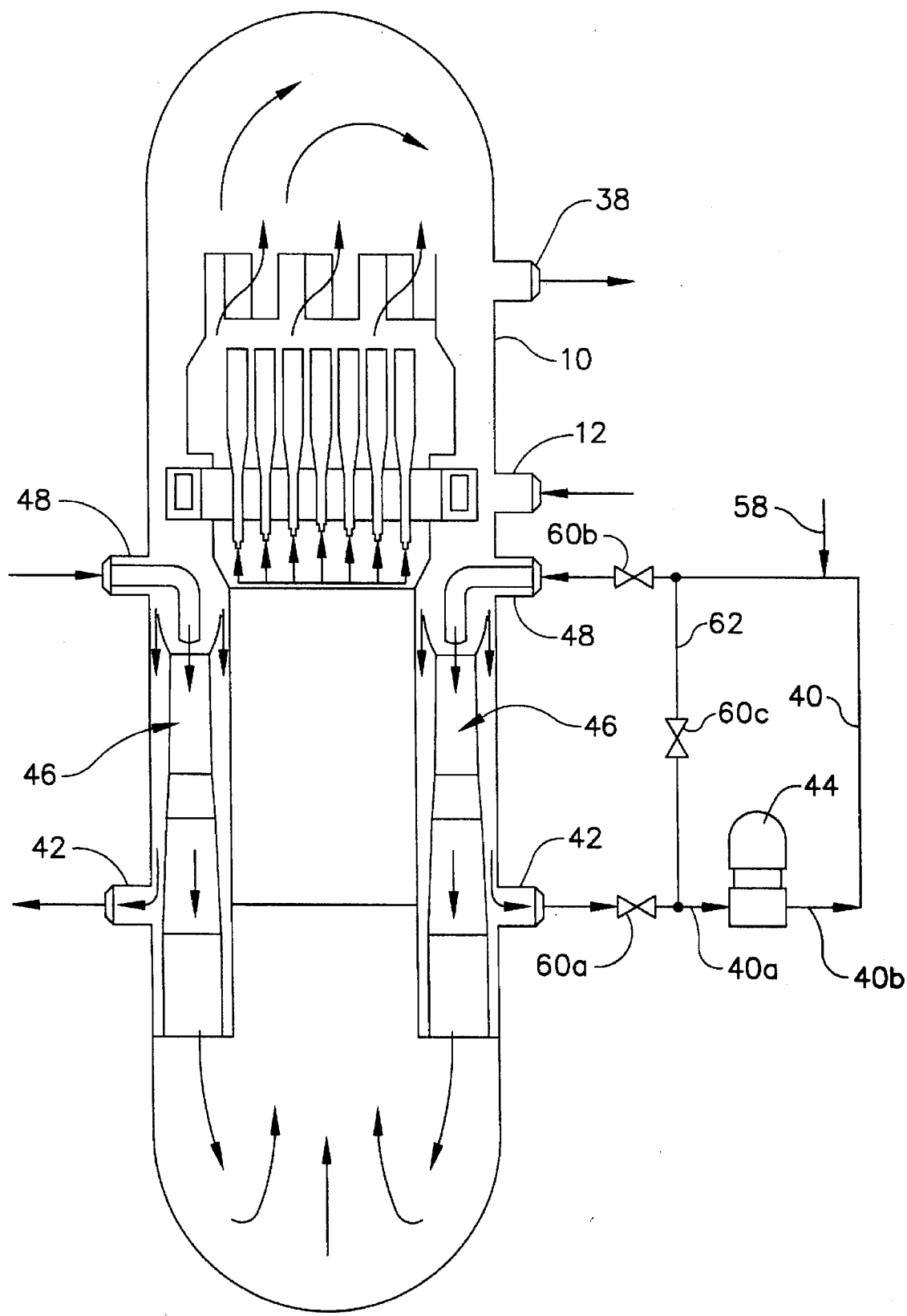
FIG. 2 is a schematic showing a recirculation line of a conventional BWR.

The BWR also includes a coolant recirculation system 40 (shown in FIG. 2) which provides the forced convection flow through the core necessary to attain the required power density. A portion of the water is sucked from the lower end of the downcomer annulus 16 via recirculation water outlet 42 and forced by a centrifugal recirculation pump 44 into jet pump assemblies 46 (only one of which is shown) via recirculation water inlets 48. The BWR has two recirculation pumps (only one of which is shown in FIG. 2), each of which provides the driving flow for a plurality of jet pump assemblies. The pressurized driving water is supplied to each jet pump nozzle 50 via an inlet riser 52, an elbow 54 and an inlet mixer 56 in flow sequence. A typical BWR has 16 to 24 inlet mixers.

During reactor operation under HWC conditions, a Cr-enriched oxide film can be formed on stainless steel surfaces. Additionally, chromate ions in the reactor water are reduced and deposited on out-of-core surfaces, namely, the oxide-coated interior surfaces of the recirculation system 40. The deposited chromium and Cr-enriched oxide film form a favorable adsorption surface for soluble radioisotopes such as Zn-65 and Co-60. Such out-of-core surfaces are resistant to chemical decontamination processes.

The present invention is a pre-oxidation treatment for decreasing the amount of chromium deposited in the oxide film and changing the structure of the Cr-enriched oxide film formed on the internal surfaces of recirculation piping, namely, line 40a (see FIG. 2) leading from the recirculation water outlet 42 to the inlet of the recirculation pump 44 and return line 40b leading from the outlet of the recirculation pump 44 to the recirculation water inlet 48. The treatment is applied after the reactor has been shutdown and the injection of hydrogen into the feedwater has been terminated. Before the hydrogen peroxide is injected into the recirculation system, the recirculation piping to be decontaminated must be isolated. This is accomplished by closing normally open valves 60a and 60b, and opening normally closed valve 60c, as depicted in FIG. 2. The valve 60c is connected via recirculation line 62. Thus, when valves 60a and 60b are closed and valve 60c is open, a closed recirculation loop is formed.

In accordance with the treatment of the present invention, hydrogen peroxide is injected into the coolant in the recirculation loop through an injection port 58, as shown in FIG. 2. Because no nuclear heat is generated during shutdown, the coolant temperature during shutdown falls and is maintained at approximately 150° C. or lower. The hydrogen peroxide is injected in an amount sufficient to maintain a concentration in the recirculating water of approximately 1 ppm or higher as needed. A dilute acid solution (e.g., nitric acid) is also injected into the loop to serve as a catalyst to accelerate the oxidation reactions. An appropriate water pH (e.g., in the range of 5–6) is maintained by acid injection. The oxidation process should be allowed to take effect in the proposed temperature range with the recirculation pump 44 in operation for at least a few hours to 24 hours, depending on the temperature and the oxide film thickness.

The Cr-enriched oxides present on the interior surfaces of the recirculation piping are readily oxidized by the hydrogen peroxide ($H_2O_2$) to a soluble chromate ($CrO_4^{-2}$) under proper conditions. As a result, some of the radioisotopes associated with the oxides will then be released into the coolant and consequently removed by the reactor water cleanup system (not shown). More importantly, the oxide structure is changed for easier dissolution by conventional decontamination solutions.

Thereafter, a conventional decontamination process is performed, e.g., a solution comprising dissolution and/or complexing agents is injected into the recirculation loop via injection port 58. The efficiency of this decontamination process is enhanced by the pre-oxidation step of the present invention.

Alternatively, a portion of the recirculation system not including the recirculation pump 44 can be subjected to the pre-oxidation step. In that event, the closed loop is formed by a connecting line having an auxiliary recirculation pump which causes the coolant to circulate. The main recirculation pump 44 is shut off.

The foregoing method has been disclosed for the purpose of illustration. Variations and modifications of the disclosed method will be readily apparent to practitioners skilled in the art of chemical decontamination. For example, it will be apparent to the skilled practitioner that any portion of the recirculation piping which can be isolated can be treated in accordance with the present invention. In addition to the application for recirculation piping, the technique may also be also be applied to other systems which have been exposed to reactor water, such as the reactor water clean-up system, the residual heat removal system and even entire BWR primary system surfaces which may require decontamination. Also, an oxidizing agent other than hydrogen peroxide can be used with appropriate catalyst under proper conditions provided that the oxidizing agent produces the desired result, namely, rapid oxidation of Cr-enriched oxide films to a soluble chromate. Such variations and modifications are intended to be encompassed by the claims set forth hereinafter.

I claim:

1. A method for treating a contaminated oxidized surface of a nuclear reactor, comprising the steps of shutting down the reactor and allowing the reactor water that wets said contaminated oxidized surface to cool to a temperature no higher than about 150° C., injecting dilute acid into the reactor water in an amount so that the pH of the reactor water that wets said contaminated oxidized surface is in the range of 5 to 6, and injecting hydrogen peroxide into the reactor water in an amount so that the reactor water that wets said contaminated oxidized surface has a hydrogen peroxide concentration of at least 1 ppm.

2. The method as defined in claim 1, wherein said contaminated oxidized surface is an interior surface of recirculation piping.

3. The method as defined in claim 1, wherein said contaminated oxidized surface is an interior surface of reactor water clean-up system piping.

4. The method as defined in claim 1, wherein said contaminated oxidized surface is an interior surface of residual heat removal system piping.

5. The method as defined in claim 1, wherein said contaminated oxidized surface is submerged in reactor water inside a reactor pressure vessel.

6. A method for treating a contaminated oxidized surface of a nuclear reactor, comprising the steps of shutting down the reactor and allowing the reactor water that wets said contaminated oxidized surface to cool to a temperature no higher than about 150°C., injecting dilute acid into the reactor water in an amount so that the pH of the reactor water that wets said contaminated oxidized surface is in the range of 5 to 6, and injecting an oxidizing agent into the reactor water in an amount so that the reactor water that wets said contaminated oxidized surface has an oxidizing agent concentration of at least 1 ppm.

7. The method as defined in claim 6, wherein the oxidizing agent is hydrogen peroxide.

8. The method as defined in claim 6, wherein said contaminated oxidized surface is an interior surface of recirculation piping.

9. The method as defined in claim 6, wherein said contaminated oxidized surface is an interior surface of reactor water clean-up system piping.

10. The method as defined in claim 6, wherein said contaminated oxidized surface is an interior surface of residual heat removal system piping.

11. The method as defined in claim 6, wherein said contaminated oxidized surface is submerged in reactor water inside a reactor pressure vessel.

12. A method for treating recirculation piping of a nuclear reactor having a reactor vessel connected to the recirculation piping by connections, comprising the steps of:

shutting down the reactor;

closing the connections between the reactor vessel and a section of recirculation piping to be treated connecting one junction of the section of recirculation piping to be treated with another junction of the section of recirculation piping to be treated to form a closed recirculation loop comprising said section of recirculation piping to be treated and excluding the reactor vessel;

circulating water through said closed recirculation loop;

injecting oxidizing agent and dilute acid into the water circulating in said closed recirculation loop, wherein the amount of dilute acid injected produces a pH in the range of 5 to 6.

13. The method as defined in claim 12, wherein the oxidizing agent is hydrogen peroxide injected in an amount sufficient to maintain a hydrogen peroxide concentration of at least approximately 1 ppm in water flowing in said closed loop.

14. The method as defined in claim 12, wherein the water circulating in said closed loop is diverted to a system which removes radioisotopes from the water.

* * * * *